(12) United States Patent
Sakyo et al.

(10) Patent No.: US 8,081,260 B2
(45) Date of Patent: Dec. 20, 2011

(54) COLOR KILLER CIRCUIT

(75) Inventors: Chikara Sakyo, Gunma-ken (JP); Hiroyuki Ebinuma, Fukaya (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 638 days.

(21) Appl. No.: 12/249,489

(22) Filed: Oct. 10, 2008

(65) Prior Publication Data

US 2009/0096928 A1   Apr. 16, 2009

(30) Foreign Application Priority Data

Oct. 11, 2007 (JP) ................. 2007-265256

(51) Int. Cl.
*H04N 9/70* (2006.01)
(52) U.S. Cl. ........ 348/643; 348/644; 348/645; 348/647; 348/648
(58) Field of Classification Search .......... None
See application file for complete search history.

(56) References Cited

FOREIGN PATENT DOCUMENTS

JP    11-308632    11/1999

OTHER PUBLICATIONS esp@cenet patent abstract for Japanese Publication No. 11308632, Publication date Nov. 5, 1999 (1 page).

*Primary Examiner* — Jefferey Harold
*Assistant Examiner* — Omer Khalid
(74) *Attorney, Agent, or Firm* — Osha • Liang LLP (57) ABSTRACT

There is provided a color killer circuit comprising a burst amplitude detection unit that detects an amplitude of a color burst; a delay unit that stores, delays, by a predetermined period of time, and outputs the detected amplitude; a subtractor that calculates a difference between an output from the burst amplitude detection unit and an output from the delay unit; a first comparator that compares the output from the burst amplitude detection unit with a first threshold value to determine whether or not the output from the burst amplitude detection unit is less than the first threshold value; and a second comparator that compares an output from the subtractor with a second threshold value to determine whether or not the output from the subtractor is greater than the second threshold value, wherein the color killer circuit masks the color component of the composite video signal when the first comparator determines that the output from the burst amplitude detection unit is less than the first threshold value, or when the second comparator determines that the output from the subtractor is greater than the second threshold value.

10 Claims, 10 Drawing Sheets

| ACC_FRAME [2 bits] | NUMBER OF FRAMES FOR WHICH AN AVERAGE VALUE IS CALCULATED [frame] | TOTAL NUMBER OF LINES FOR WHICH AN AVERAGE VALUE IS CALCULATED [line] |
|---|---|---|
| 0 | 1 | 128 |
| 1 | 2 | 256 |
| 2 | 4 | 512 |
| 3 | 8 | 1024 |

PRIOR ART

FIG. 10

PRIOR ART

COLOR KILLER CIRCUIT

CROSS-REFERENCE TO RELATED APPLICATION

The disclosure of Japanese Patent Application No. 2007-265256 including specification, claims, drawings and abstract is incorporated herein by reference in its entirety.

BACKGROUND

1. Technical Field

The present invention relates to a color killer circuit that masks a color component when a composite video signal including a color component signal and a luminance component signal is processed.

2. Related Art

Figure 9:
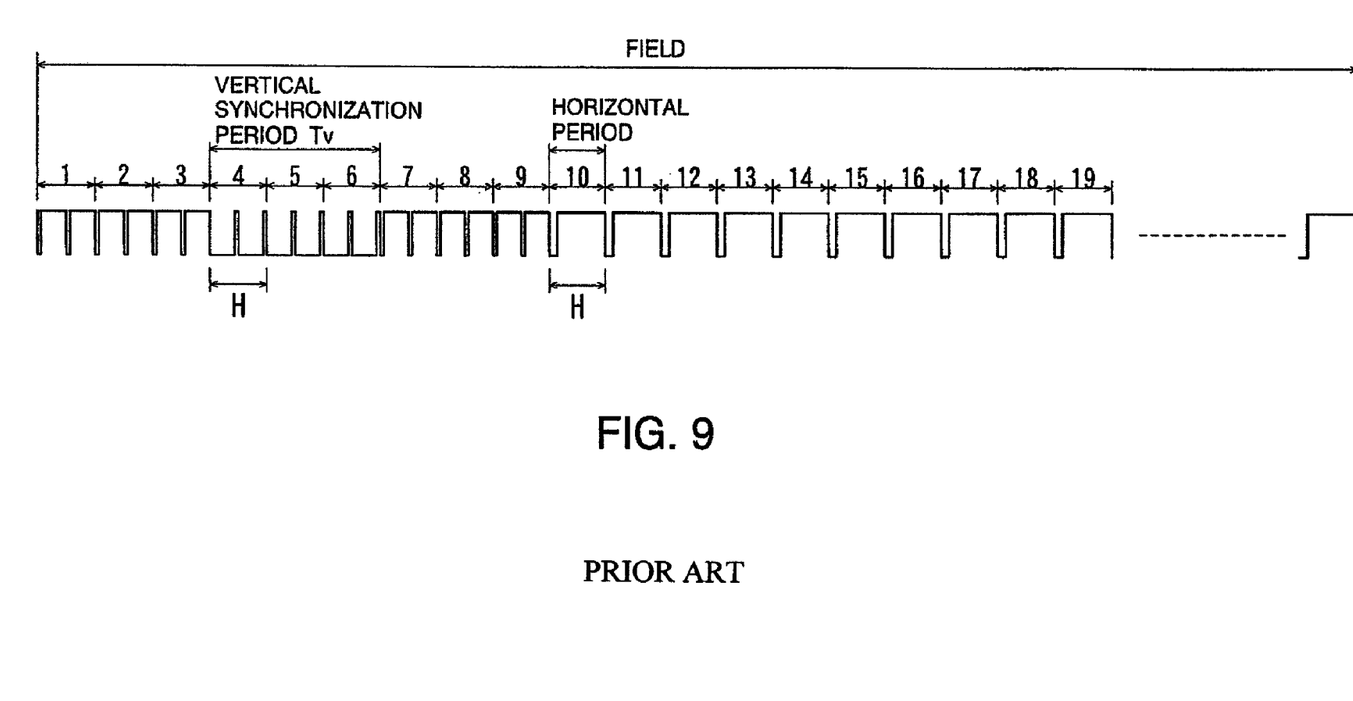
FIG. 9 shows a structure of a video signal.
Figure 10:
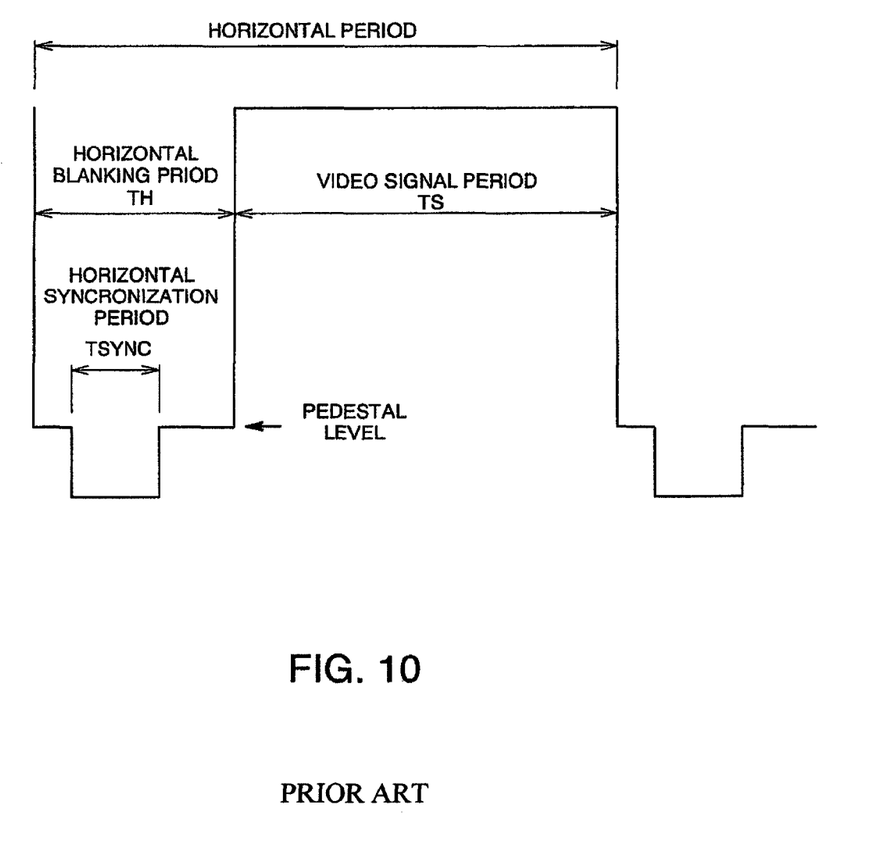
FIG. 10 shows a structure of a video signal.

In video signals for the NTSC system or other systems (composite video signals), as shown in FIGS. 9 and 10, one field of a video signal SIN includes a vertical synchronization period $T_V$, a horizontal blanking period $T_H$, and a video signal period $T_S$, and the video signal $S_{IN}$ for one horizontal line includes a horizontal blanking period $T_H$, a color burst period $T_C$, and an effective video signal period $T_I$. It should be noted that, for the sake of clarity of description, FIGS. 9 and 10 show an example in which the ratios of the respective periods are changed from those of an actual video signal $S_{IN}$.

In the processing of such a video signal to display a video image, when the strength of an input video signal is weak, or when noise is large with respect to the strength of the video signal, routinely processing the video signal may result in occurrence of uneven color or other irregularities, causing a video image to distort. With this being the situation, a color component output may be blocked so that a monochrome video image containing luminance information only is displayed.

Figure 11:
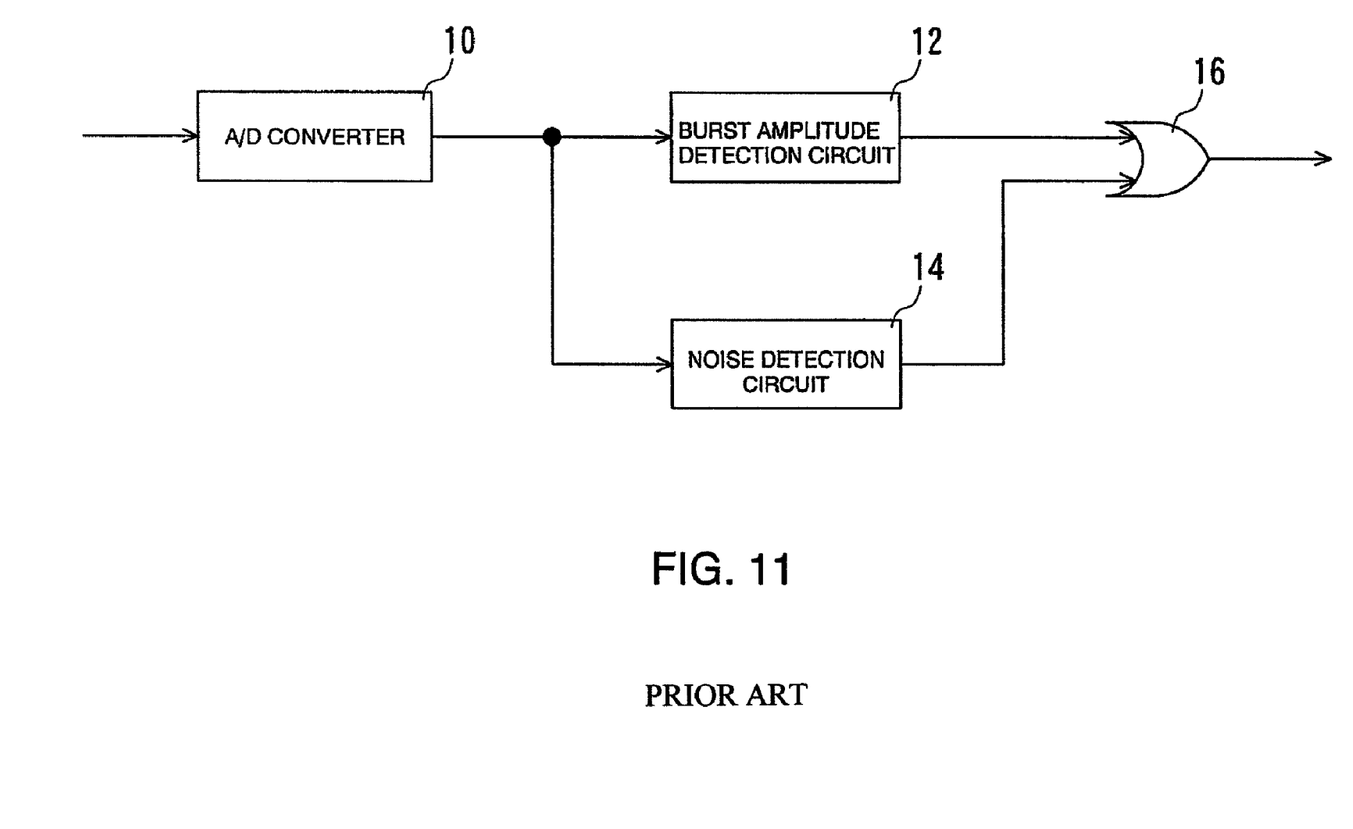
FIG. 11 is a block diagram showing a structure of a color killer circuit according to the related art.

In order to perform processing while thus masking a color component, a color killer circuit has been used. The color killer circuit includes, as shown in FIG. 11, an analog-to-digital converter 10, a burst amplitude detection unit 12, a noise detection unit 14, and an OR element 16.

Figure 12:
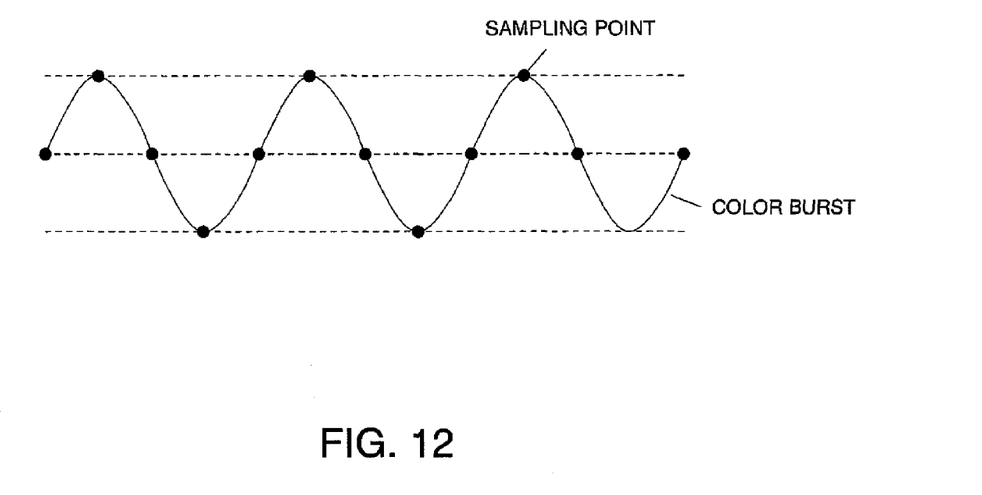
FIG. 12 illustrates a sampling method.

The analog-to-digital converter 10 converts an input video signal to a digital signal, which is input to the burst amplitude detection unit 12 and the noise detection unit 14. The analog-to-digital converter 10 samples signals at a sampling rate four times a frequency of the color burst included in the video signal. In this process, as shown in FIG. 12, sampling timing is adjusted so that a sampling point matches with a peak of one cycle of the color burst.

The burst amplitude detection unit 12 receives the digitalized video signal, and extracts an amplitude of the color burst for each video signal of one horizontal line. The burst amplitude detection unit 12 determines whether or not the extracted amplitude is less than a preset first threshold value. An output to the OR element 16 is set to HIGH level when the extracted amplitude is less than the preset first threshold value, and otherwise is set to LOW level.

The noise detection unit 14 receives the digitalized video signal, and determines a strength of noise superimposed on the video signal. The strength of noise can be estimated based on whether or not an average strength of input video signals is less than a preset second threshold value. The noise detection unit 14 sets an output to the OR element 16 to HIGH level when an average strength of input video signals is less than the preset second threshold value, and otherwise sets it to LOW level.

The OR element 16 receives outputs from the burst amplitude detection unit 12 and the noise detection unit 14, sets a killer determination signal to HIGH level when at least one of those outputs has HIGH level, and sets a killer determination signal to LOW level when both of those outputs have LOW level. Thus, when the strength of an input video signal is weak, or when noise is large with respect to the strength of the video signal, it is possible to determine, based on the killer determination signal, whether or not the color signal should be masked to perform processing.

However, the above-described related-art color killer circuit requires, in addition to the burst amplitude detection unit 12 for extracting a maximum peak value of the color burst, the noise detection unit 14 for determining whether or not the electric field strength of the video signal is under weak electric field conditions under which it is less than a predetermined threshold value.

Therefore, there have been problems in that the color killer circuit has a complicated circuit structure, and is large in circuit scale. As a result, there is also a problem in that the cost of manufacturing an apparatus including the color killer circuit is increased.

SUMMARY

According to one aspect of the present invention, there is provided a color killer circuit comprising a burst amplitude detection unit that detects an amplitude of a color burst included in a composite video signal including signals for a color component and a luminance component; a delay unit that stores, delays, by a predetermined period of time, and outputs the amplitude of the color burst detected by the burst amplitude detection unit; a subtractor that calculates a difference between an output from the burst amplitude detection unit and an output from the delay unit; a first comparator that compares the output from the burst amplitude detection unit with a first threshold value to determine whether or not the output from the burst amplitude detection unit is less than the first threshold value; and a second comparator that compares an output from the subtractor with a second threshold value to determine whether or not the output from the subtractor is greater than the second threshold value, wherein the color killer circuit masks the color component of the composite video signal when the first comparator determines that the output from the burst amplitude detection unit is less than the first threshold value, or when the second comparator determines that the output from the subtractor is greater than the second threshold value.

BRIEF DESCRIPTION OF THE DRAWINGS

Exemplary embodiments of the present invention will be described in detail based on the following figures, wherein.

DETAILED DESCRIPTION

Figure 1:
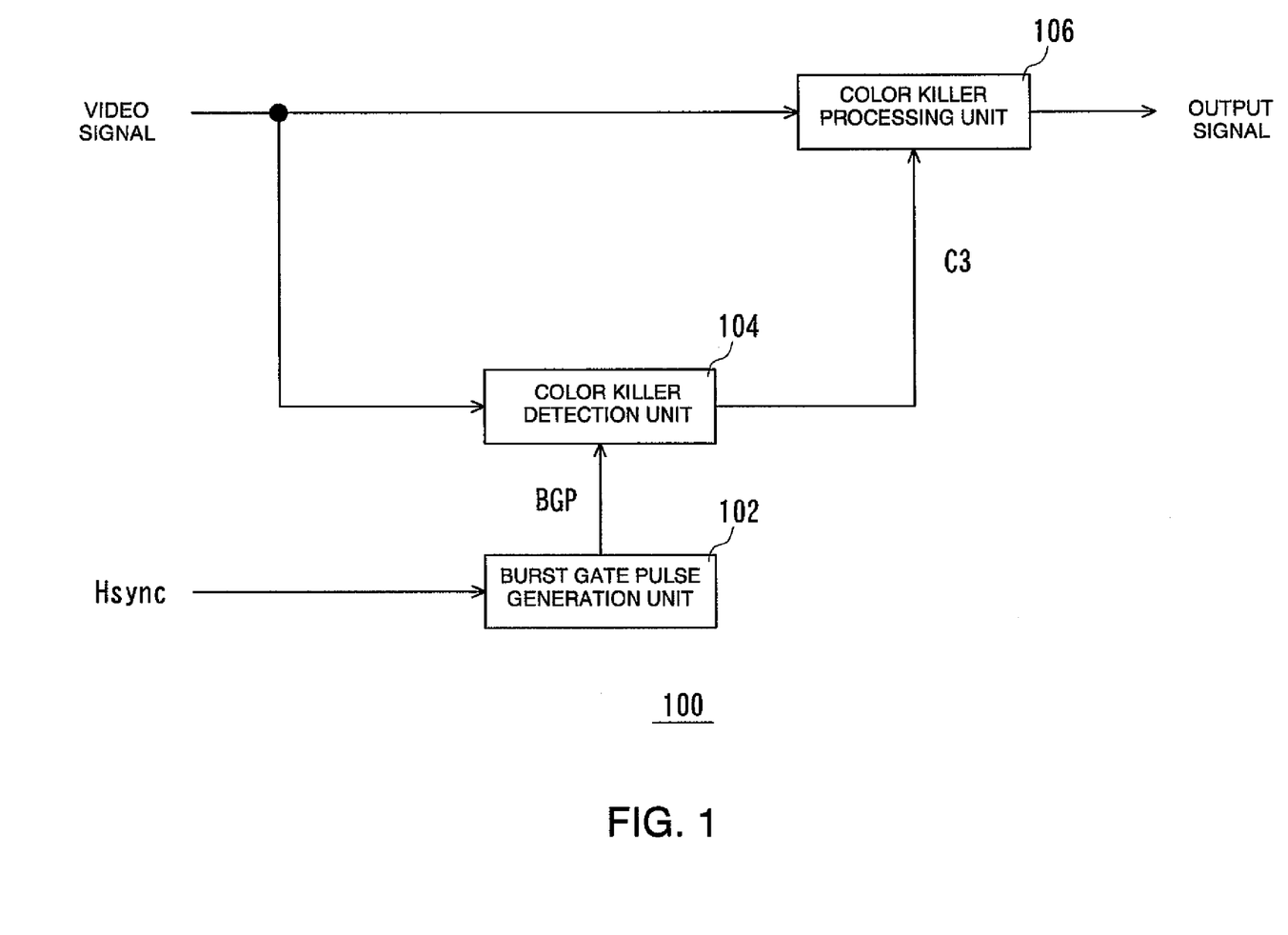
FIG. 1 is a block diagram showing a structure of a color killer circuit according to an embodiment of the present invention.

According to an embodiment of the present invention, a color killer circuit 100 includes a burst gate pulse generation unit 102, a color killer detection unit 104, and a color killer processing unit 106, as shown in FIG. 1. The color killer circuit 100 processes a video signal, such as an NTSC system video signal including a color burst, as shown in FIGS. 9 and 10.

The burst gate pulse generation unit 102 receives, from a preceding-stage synchronization signal detection unit (not shown), a horizontal synchronization timing pulse Hsync indicating timing of a horizontal synchronization signal, and starts timing detection using a counter. Then, after a predetermined period of time has passed from a rise time of the horizontal synchronization timing pulse Hsync, or in other words, during a color burst period of the video signal, the burst gate pulse generation unit 102 generates and outputs, to the color killer detection unit 104, a burst gate pulse BGP having a pulse width corresponding to one cycle of the color burst.

Figure 2:
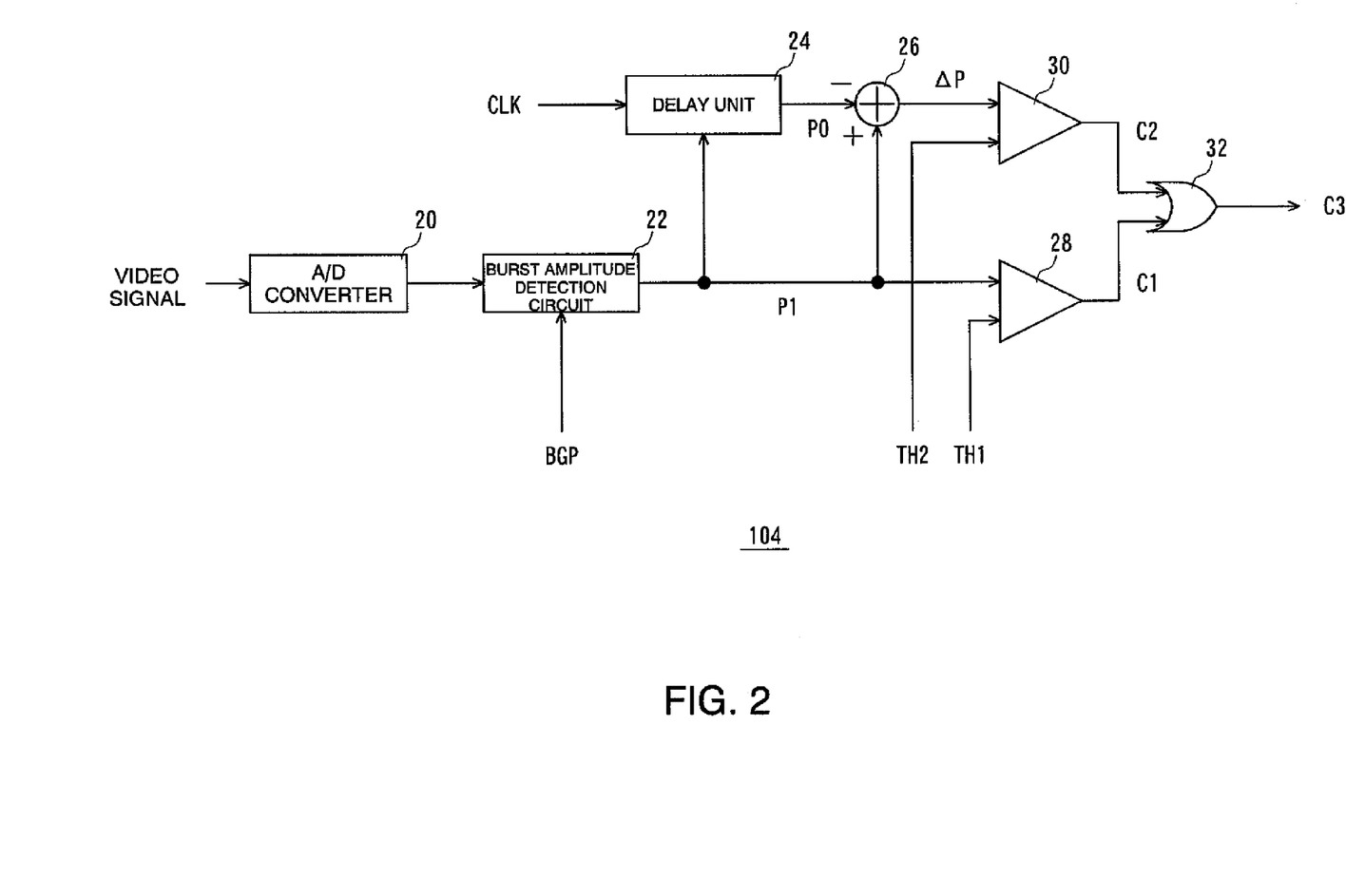
FIG. 2 is a block diagram showing a structure of a color killer detection unit according to the embodiment of the present invention.

The color killer detection unit 104 includes an analog-to-digital converter 20, a burst amplitude detection unit 22, a delay unit 24, a subtractor 26, comparators 28 and 30, and an OR element 32, as shown in FIG. 2. The color killer detection unit 104 has the function of determining whether or not the color killer processing unit 106 should perform processing to mask a color signal of the video signal.

The analog-to-digital converter 20 receives a video signal, converts the video signal into a digital signal through sampling, and outputs the digital signal. In this process, the sampling is performed at a frequency at least four times the frequency of the color burst. In this process, a peak position of an amplitude of the color burst is detected through peak detection, and the sampling is performed such that each peak position of the color burst corresponds to a sampling point, as shown in FIG. 3.

The burst amplitude detection unit 22 receives the video signal sampled by the analog-to-digital converter 20 and the burst gate pulse BGP, and extracts and outputs a peak value of the color burst. The burst gate pulse BGP is a signal having a pulse width corresponding to one cycle of the color burst in the color burst period. Therefore, a maximum sample value of sampling points included in a period during which the burst gate pulse BGP is at HIGH level is detected and output as the peak value of the color burst.

Figure 3:
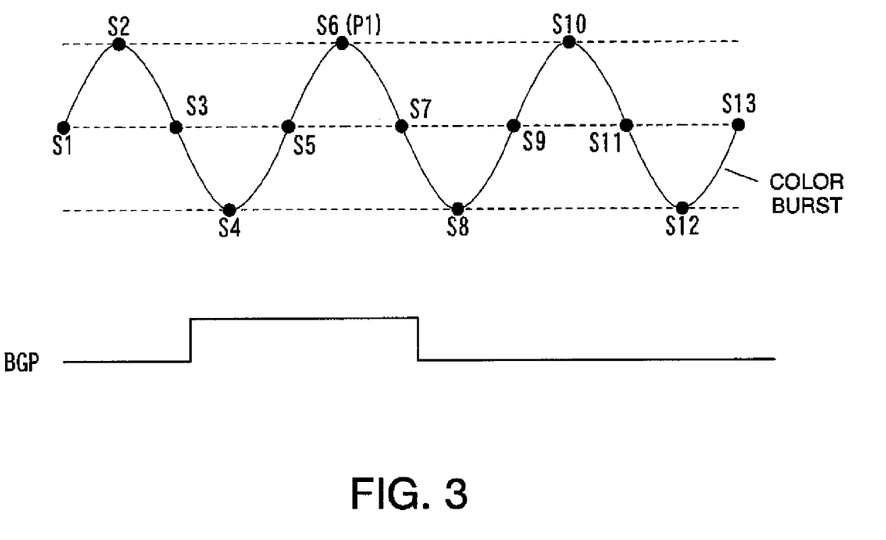
FIG. 3 illustrates a sampling method according to the embodiment of the present invention.

For example, in the example of sampling of the color burst shown in FIG. 3, a sample value D6 of a sampling point S6 having a maximum value of sampling points S4, S5, S6, and S7 included in a period during which the burst gate pulse BGP rises is extracted and output as a peak value P1 of the color burst.

The comparator 28 receives the peak value P1 of the color burst output from the burst amplitude detection unit 22, and determines whether or not the peak value P1 is less than a predetermined amplitude determination threshold value (first threshold value) TH1. The amplitude determination threshold value TH1 may be prestored in a register (not shown) included in the color killer circuit 100. The comparator 28 sets an output C1 to HIGH level when the peak value P1 is less than the amplitude determination threshold value TH1, and otherwise sets the output C1 to LOW level.

Figure 4:
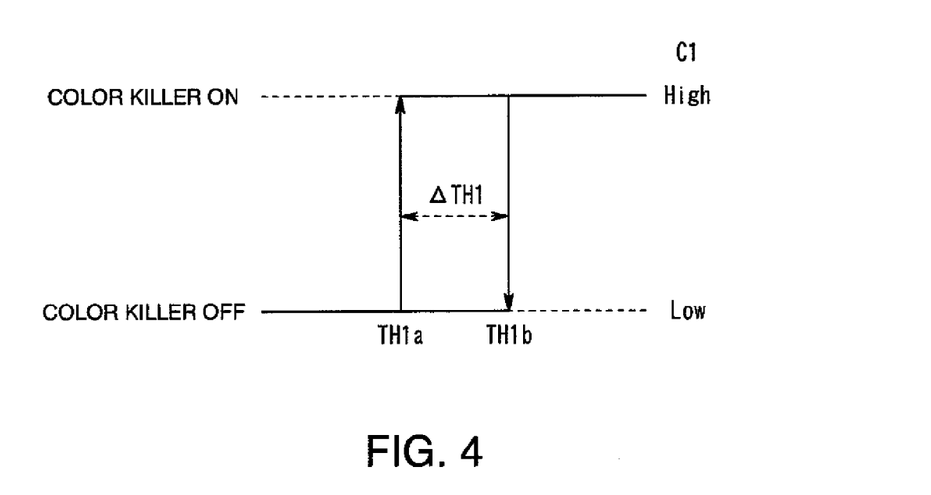
FIG. 4 illustrates hysteresis characteristics of a comparator according to the embodiment of the present invention.

It should be noted that the amplitude determination threshold value TH1 of the comparator 28 may have hysteresis characteristics. More specifically, as shown in FIG. 4, the amplitude determination threshold value TH1$a$ at which the output C1 is switched from LOW level to HIGH level is set to be less than an amplitude determination threshold value TH1$b$(=TH1$a$+ΔTH1) at which the output C1 is switched from HIGH level to LOW level. Thus, after the peak value P1 becomes less than the amplitude determination threshold value TH1$a$, and the output C1 is set to HIGH level, the amplitude determination threshold value TH1$b$ is used as a determination reference value so that the output C1 will not be switched back to LOW level until the peak value P1 becomes greater than or equal to the amplitude determination threshold value TH1$b$. Thus, even when the peak value P1 varies with time near the amplitude determination threshold value TH1$a$, the output C1 of the comparator 28 can be prevented from unnecessarily switching between LOW level and HIGH level.

The delay unit 24 receives the peak value of the color burst output from the burst amplitude detection unit 22, counts reference clocks such as externally input system clocks, and delays, by one horizontal period of the video signal, and outputs the peak value P1 of the color burst. It should be noted that the delay time is one horizontal period in the present embodiment, but may be any constant multiple of the horizontal period.

The subtractor 26 receives the peak value P1 of the color burst output from the burst amplitude detection unit 22 and a peak value P0 delayed by one horizontal period, which is output from the delay unit 24, and calculates and outputs a difference between those values.

Figure 5:
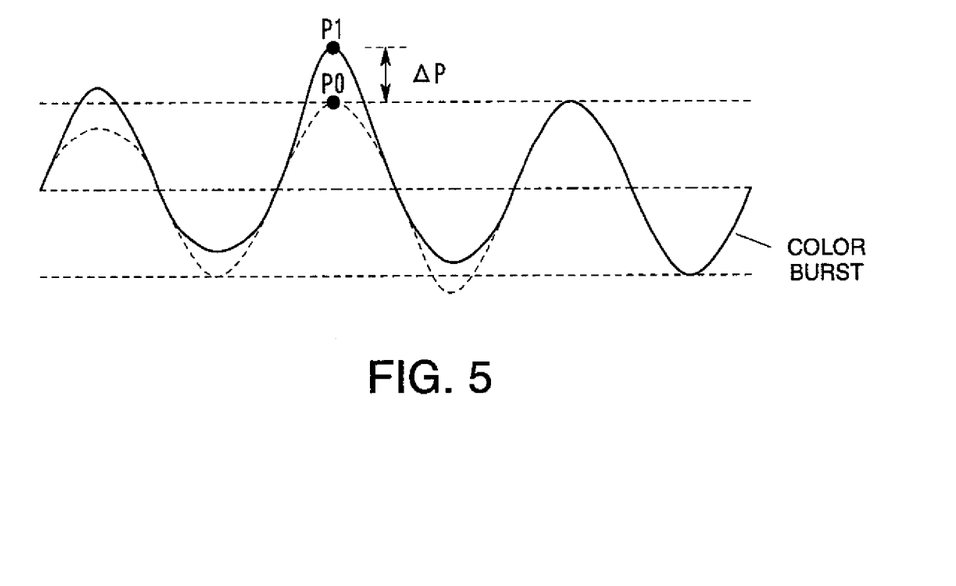
FIG. 5 illustrates a difference calculation method according to the embodiment of the present invention.

Through this process performed by the subtractor 26, as shown in FIG. 5, a difference ΔP(=P1-P0) between the peak value P0 of the color burst included in the previous horizontal line and the peak value P1 of the color burst included in the current horizontal line is obtained. Because noise superimposed on a video signal constitutes random noise varying with respect to time, the greater the noise, the more likely a difference will occur between a noise component included in the peak value P0 of the color burst included in the previous horizontal line and a noise component included in the peak value P1 of the color burst included in the current horizontal line, and the greater the variation in peak values tends to be. Therefore, the greater the noise, the higher the possibility that the difference value ΔP between these peak values will become larger.

The comparator 30 receives the difference value ΔP of the peak value output from the subtractor 26, and determines whether or not the difference value ΔP is greater than a predetermined noise determination threshold value (second threshold value) TH2. The noise determination threshold value TH2 may be prestored in a register (not shown) included in the color killer circuit 100. The comparator 30 sets an output C2 to HIGH level when the difference value ΔP is greater than the noise determination threshold value TH2, and otherwise sets the output C2 to LOW level.

Figure 6:
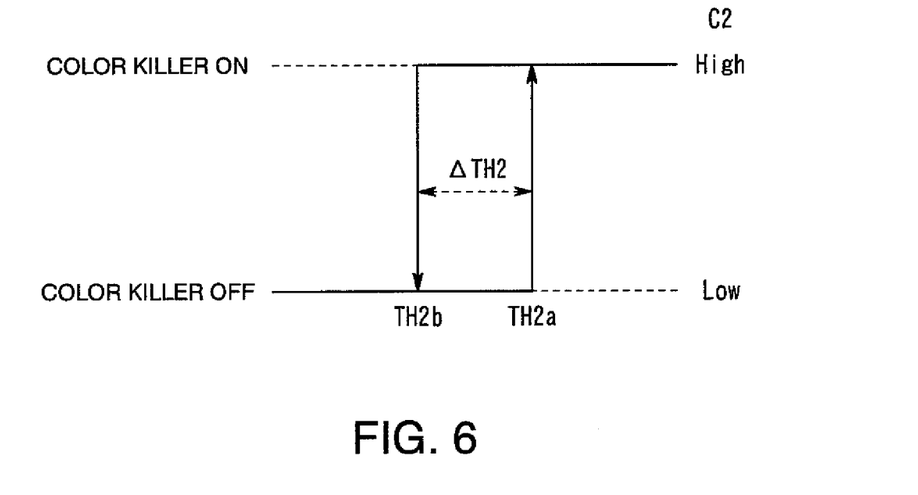
FIG. 6 illustrates hysteresis characteristics of a comparator according to the embodiment of the present invention.

It should be noted that, as in the comparator 28, the amplitude determination threshold value TH2 may have hysteresis characteristics. More specifically, as shown in FIG. 6, the amplitude determination threshold value TH2a at which the output C2 is switched from LOW level to HIGH level is set to be greater than a amplitude determination threshold value TH2b(=TH2a-ΔTH2) at which the output C2 is switched from HIGH level to LOW level. Thus, after the difference value ΔP becomes greater than the amplitude determination threshold value TH2a, and the output C2 is set to HIGH level, the amplitude determination threshold value TH2b is used as a determination reference value so that the output C2 will not be switched back to LOW level until the difference value ΔP becomes less than or equal to the amplitude determination threshold value TH2b. Thus, even when the difference value ΔP varies with time near the amplitude determination threshold value TH2a, the output C2 of the comparator 30 can be prevented from unnecessarily switching between LOW level and HIGH level.

The OR element 32 receives the output C1 of the comparator 28 and the output C2 of the comparator 30, calculates a logical OR of the two, and outputs the result as a killer determination signal C3. More specifically, the killer determination signal C3 has HIGH level when either one of the output C1 and the output C2 is at HIGH level, and otherwise the killer determination signal C3 has LOW level. The killer determination signal C3 is input to the color killer processing unit 106.

The color killer processing unit 106 receives a color signal separated from the video signal and the killer determination signal C3, and performs processing to mask the color signal in accordance with the killer determination signal C3. The color signal input to the color killer processing unit 106 may be a signal which is separated, together with a luminance signal, from the video signal in a processing circuit preceding the color killer circuit 100, and is digitally converted. However, it is optional whether or not to perform digitalization. The color killer processing unit 106 does not output the color signal when the killer determination signal C3 has HIGH level, and outputs the color signal to a following-stage processing circuit (not shown) when the killer determination signal C3 has LOW level.

The following-stage processing circuit performs processing to reproduce a color video image including the color signal when the color signal is not masked, and to reproduce a monochrome video image only from the luminance signal separated from the video signal when the color signal is masked. However, the processing performed by the following-stage processing circuit is not limited to the above-described processing.

As described above, by employing the color killer circuit 100, when the strength of the video signal is low, or when noise is large, it is possible to perform processing while masking a color signal. More specifically, without performing a weak electric field detection process in which an amplitude of a video signal is compared with a predetermined threshold value, by comparing color bursts included in the video signal with each other, it is possible to determine whether or not noise is included. Thus, color killer determination can be performed in a simple structure with an adequate detection sensitivity.

Modification 1

Figure 7:
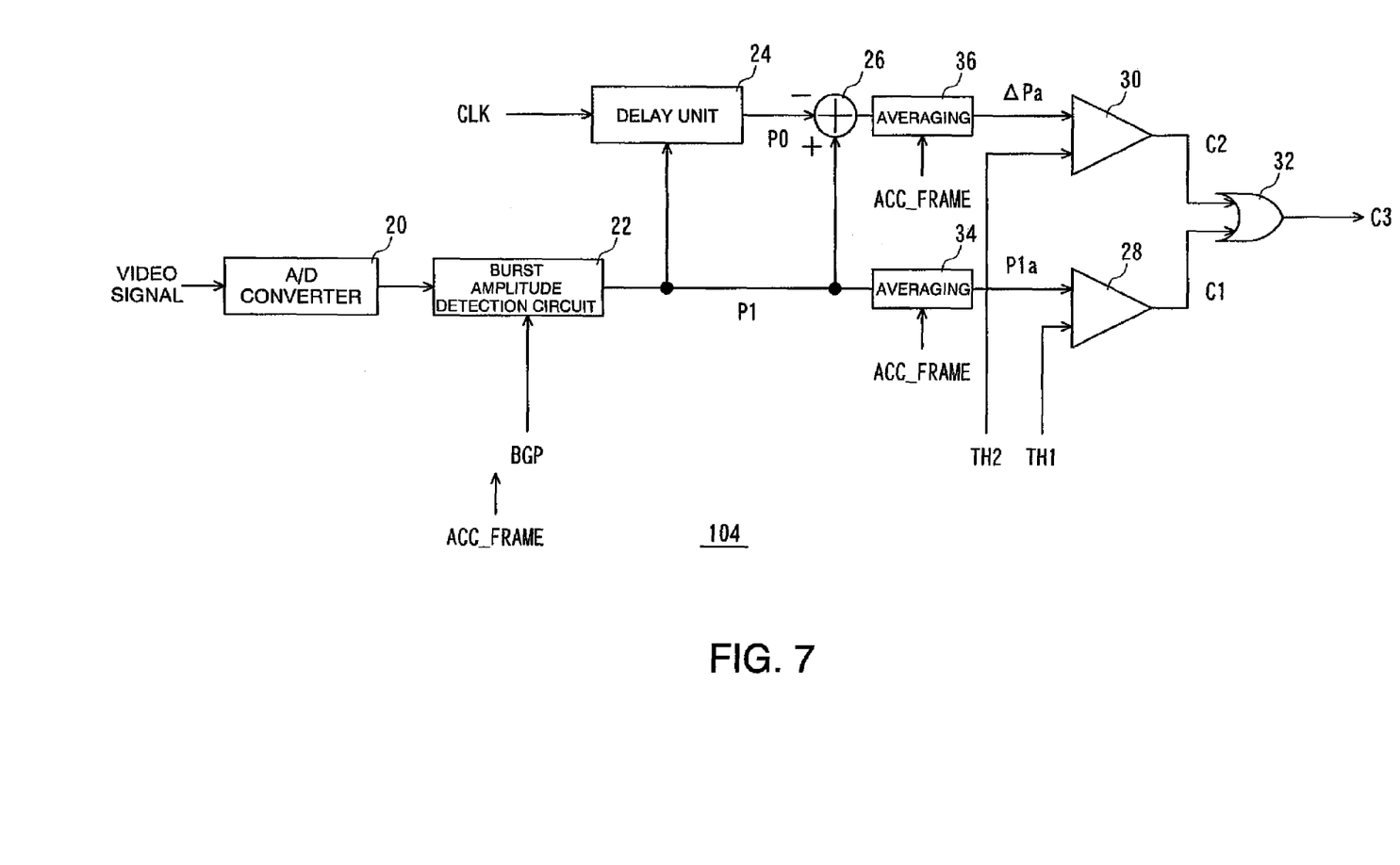
FIG. 7 is a block diagram showing a structure of a color killer detection unit according to a modification of the embodiment.

A color killer circuit according to a modification of the embodiment of the present invention has an overall structure similar to that of the color killer circuit 100, but differs in that the color killer detection unit 104 includes averaging units 34 and 36, as shown in FIG. 7.

The averaging unit 34 averages peak values P1 of color bursts output from the burst amplitude detection unit 22 over a plurality of horizontal lines. For example, the averaging is performed over effective horizontal lines included in one frame of a video signal. The term "effective horizontal lines" refers to horizontal lines which include effective signals for representing a video image, excluding horizontal lines such as those included in vertical blanking periods included in video signals. Alternatively, the averaging may be performed over a plurality of frames for effective horizontal lines included in a video signal.

Figure 8:
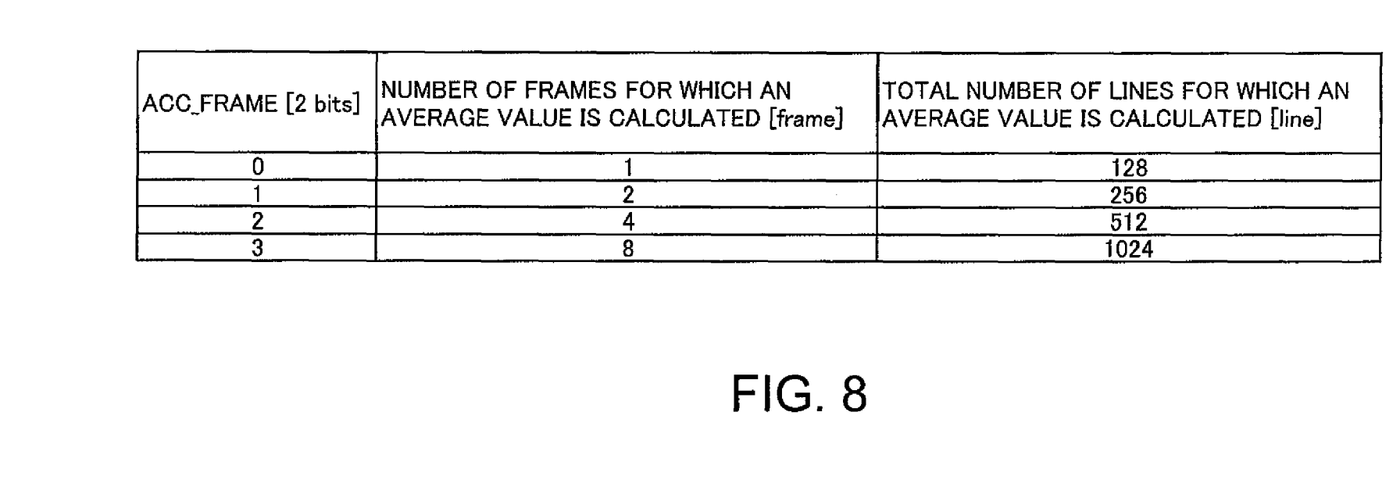
FIG. 8 shows a relationship between a register value ACC_FRAME and the number of frames over which averaging is performed, according to the modification of the embodiment.

Specifically, when one frame of a video signal has 128 effective horizontal lines ranging from the 10th horizontal line to the 137th horizontal line, and the averaging is performed over a specified number of frames as shown in FIG. 8 using a value ACC_FRAME (2 bits) set in a register (not shown) attached to the averaging unit 34, an average value $P1_{AVE}$ can be obtained by the following equation (1):

$$P1_{AVE} = \frac{1}{128 \times 2^{ACC\_FRAME}} \sum_{F=0}^{2^{ACC\_FRAME}} \sum_{H=9}^{136} P1_{FH} \quad (1)$$

One frame of an NTSC signal has a total of 525 horizontal lines, among which color burst carrier lines are from the 10th horizontal line to the 263rd horizontal line, and from the 273rd horizontal line to the 525th horizontal line. In this example, for the sake of circuit simplicity, the 10th horizontal line to the 137th horizontal line of one frame are used for detection.

The output P1a from the averaging unit 34 is input to the comparator 28. The processing performed by the comparator 28 is similar to that of the above-described embodiment. Here, because the peak values P1 of the color bursts are averaged, the instability in the processing caused by the variation in peak value P1 for each horizontal line can be reduced. More specifically, by averaging amplitudes of color bursts, which are under determination, over a plurality of horizontal lines, it is possible to more reliably determine whether or not the strength of a video signal is weak.

The averaging unit 36 averages differences ΔP between peak values of color bursts output from the subtractor 26 over a plurality of horizontal lines. For example, the averaging is performed over effective horizontal lines included in one frame of a video signal. Alternatively, the averaging may be performed over a plurality of frames for effective horizontal lines included in a video signal.

Similarly as with the above-described example, when one frame of a video signal has 128 effective horizontal lines ranging from the 10th horizontal line to the 137th horizontal line, and the averaging is performed over a specified number of frames as shown in FIG. 8 using a value ACC_FRAME (2 bits) set in a register (not shown) attached to the averaging unit 36, an average value $P2_{AVE}$ can be obtained by the following equation (2):

$$P2_{AVE} = \frac{1}{128 \times 2^{ACC\_FRAME}} \sum_{F=0}^{2^{ACC\_FRAME}} \sum_{H=9}^{136} P2_{FH} \quad (2)$$

The output ΔPa from the averaging unit 36 is input to the comparator 30. The processing performed by the comparator 30 is similar to that of the above-described embodiment. Here, because the difference values ΔP are averaged, the instability in the processing caused by the variation in difference value ΔP for each horizontal line can be reduced. Especially, when noise is large, because the variance value of a difference value ΔP for each horizontal line is also large, variation tends to occur in determining the strength of noise in the comparator 30, but, by averaging difference values ΔP over a plurality of horizontal lines, it is also possible to reduce the variation in determination.

It should be noted that both or either one of the averaging units 34 and 36 may be provided. Even when either one of the averaging units 34 and 36 is provided, an advantage can be obtained in that the stability of a color killer circuit can be increased.

What is claimed is:

1. A color killer circuit, comprising:
   an analog-to-digital converter configured to convert an input video signal to a digital signal, which is input to a burst amplitude detection unit;
   the burst amplitude detection unit that detects an amplitude of a color burst included in a composite video signal including signals for a color component and a luminance component;
   a delay unit that stores, delays, by a predetermined period of time, and outputs the amplitude of the color burst detected by the burst amplitude detection unit;
   a subtractor that calculates a difference between an output from the burst amplitude detection unit and an output from the delay unit;
   a first comparator that compares the output from the burst amplitude detection unit with a first threshold value to determine whether or not the output from the burst amplitude detection unit is less than the first threshold value; and
   a second comparator that compares an output from the subtractor with a second threshold value to determine whether or not the output from the subtractor is greater than the second threshold value, wherein
   the color killer circuit masks the color component of the composite video signal when the first comparator determines that the output from the burst amplitude detection unit is less than the first threshold value, or when the second comparator determines that the output from the subtractor is greater than the second threshold value.

2. The color killer circuit according to claim 1, further comprising:
   a burst averaging unit that averages amplitudes of color bursts output from the burst amplitude detection unit for a plurality of horizontal lines included in the composite video signal, wherein
   the first comparator compares, instead of the output from the burst amplitude detection unit, an output from the burst averaging unit with the first threshold value to determine whether or not the output from the burst averaging unit is less than the first threshold value, and
   the color killer circuit masks the color component of the composite video signal when the first comparator determines that the output from the burst averaging unit is less than the first threshold value, or when the second comparator determines that the output from the subtractor is greater than the second threshold value.

3. The color killer circuit according to claim 1, further comprising:
   a noise averaging unit that averages outputs from the subtractor for a plurality of horizontal lines included in the composite video signal, wherein
   the second comparator compares, instead of the output from the subtractor, an output from the noise averaging unit with the second threshold value to determine whether or not the output from the noise averaging unit is greater than the second threshold value, wherein
   the color killer circuit masks the color component of the composite video signal when the first comparator determines that the output from the burst amplitude detection unit is less than the first threshold value, or when the second comparator determines that the output from the noise averaging unit is greater than the second threshold value.

4. The color killer circuit according to claim 1, wherein
   the first comparator sets the first threshold value to a smaller value when the first comparator determines that the output from the burst amplitude detection unit is less than the first threshold value, and
   the first comparator sets the first threshold value to a larger value when the first comparator determines that the output from the burst amplitude detection unit is equal to or greater than the first threshold value.

5. The color killer circuit according to claim 2, wherein
   the first comparator sets the first threshold value to a smaller value when the first comparator determines that the output from the burst amplitude detection unit or the output from the burst averaging unit is less than the first threshold value, and
   the first comparator sets the first threshold value to a larger value when the first comparator determines that the output from the burst amplitude detection unit or the output from the burst averaging unit is equal to or greater than the first threshold value.

6. The color killer circuit according to claim 3, wherein
   the first comparator sets the first threshold value to a smaller value when the first comparator determines that the output from the burst amplitude detection unit or the output from the noise averaging unit is less than the first threshold value, and
   the first comparator sets the first threshold value to a larger value when the first comparator determines that the output from the burst amplitude detection unit or the output from the noise averaging unit is equal to or greater than the first threshold value.

7. The color killer circuit according to claim 1, wherein
   the second comparator sets the second threshold value to a larger value when the second comparator determines that the output from the subtractor is greater than the second threshold value, and
   the second comparator sets the second threshold value to a smaller value when the second comparator determines that the output from the subtractor is equal to or less than the second threshold value.

8. The color killer circuit according to claim 2, wherein
   the second comparator sets the second threshold value to a larger value when the second comparator determines that the output from the subtractor or the output from the burst averaging unit is greater than the second threshold value, and
   the second comparator sets the second threshold value to a smaller value when the second comparator determines that the output from the subtractor or the output from the burst averaging unit is equal to or less than the second threshold value.

9. The color killer circuit according to claim 3, wherein
   the second comparator sets the second threshold value to a larger value when the second comparator determines that the output from the subtractor or the output from the noise averaging unit is greater than the second threshold value, and the second comparator sets the second threshold value to a smaller value when the second comparator determines that the output from the subtractor or the output from the noise averaging unit is equal to or less than the second threshold value.

10. The color killer circuit according to claim 4, wherein
the second comparator sets the second threshold value to a larger value when the second comparator determines that the output from the subtractor is greater than the second threshold value, and the second comparator sets the second threshold value to a smaller value when the second comparator determines that the output from the subtractor is equal to or less than the second threshold value.

* * * * *